Oct. 18, 1955 R. R. READING 2,721,148
SPRAY DEVICE FOR RETREADING TIRES AND THE LIKE USES
Filed July 23, 1954 2 Sheets-Sheet 1

RALPH R. READING,
INVENTOR.
HUEBNER, BEEHLER,
WORREL & HERZIG,
ATTORNEYS.
BY
Albert M. Herzig Oct. 18, 1955   R. R. READING   2,721,148
SPRAY DEVICE FOR RETREADING TIRES AND THE LIKE USES
Filed July 23, 1954   2 Sheets—Sheet 2
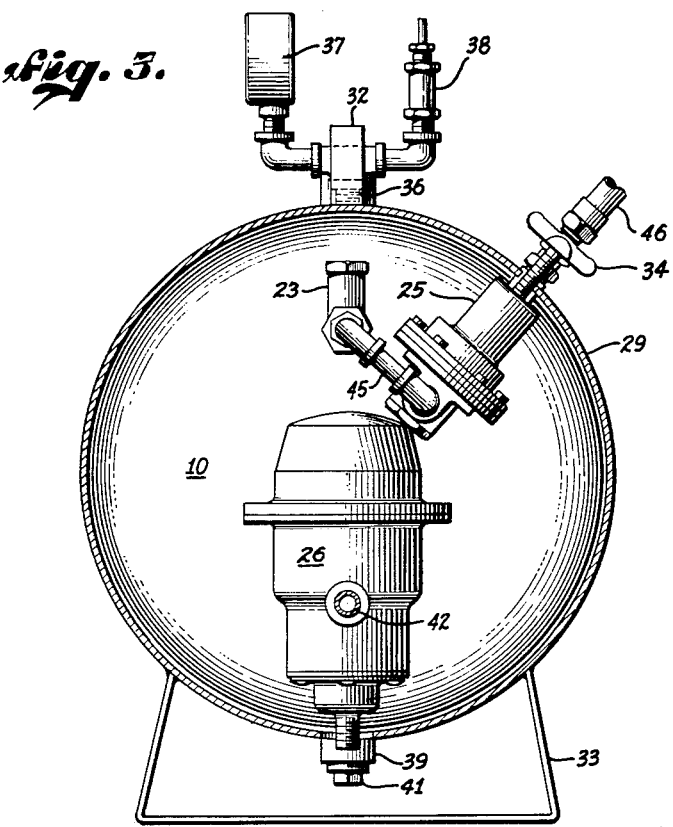
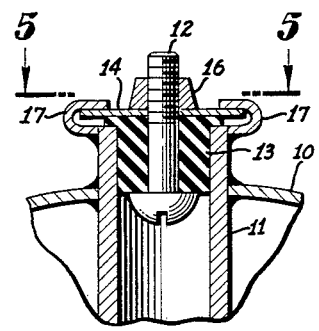
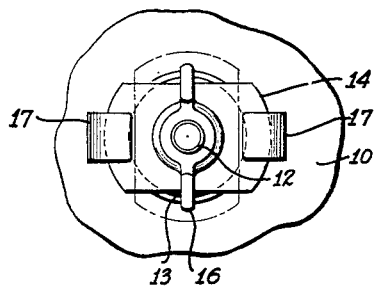
RALPH R. READING,
INVENTOR.
HUEBNER, BEEHLER,
WORREL & HERZIG,
ATTORNEYS.
BY
Albert M. Herzig

United States Patent Office 2,721,148
Patented Oct. 18, 1955

2,721,148

SPRAY DEVICE FOR RETREADING TIRES AND THE LIKE USES

Ralph R. Reading, Hawthorne, Calif.

Application July 23, 1954, Serial No. 445,323

4 Claims. (Cl. 117—104)

The present invention relates to a method and apparatus for dispensing rubber cement and relates particularly to the application of rubber cement to a tire carcass.

An object of my invention is to provide a safe, rapid and economical method and apparatus for dispensing rubber cement.

Another object of my invention is the provision of such a method and apparatus for spraying rubber cement under fireproof conditions and conditions of reduced health hazard to the surface of an article.

A further object is to apply an even coating of rubber cement to an article such as a tire carcass so that the strength of adhesion of an applied layer such as camelback is greatly increased and the resulting product is free of blow-holes.

An additional object of my invention is to economize in the labor, material, time and equipment required to apply camelback to a given number of tire carcasses and at the same time produce a better, stronger and more uniform product.

These and other related objects I prefer to accomplish by providing an apparatus for dispensing rubber cement comprising the following: A pressure vessel is equipped with cement introduction means for conveniently charging a measured volume of liquid cement to the vessel. The volume of cement charged is made to bear a rather definite ratio to the total capacity of the vessel. The pressure vessel also is provided with gas inlet means for introducing a quantity of gas under pressure into the vessel at a zone below the surface of the cement therein, preferably near the bottom of the liquid body of cement. The gas is preferably injected into the liquid cement through small apertures such as pin holes to produce in the pressure vessel a dispersion, preferably a homogeneous emulsion of gas in liquid cement under a desired final pressure. In addition, the pressure vessel is provided with outlet means for discharging and dispensing the emulsion from the vessel and on to the surface of an article. I prefer, however, to first admix the emulsion with an additional amount of gas under pressure before applying the cement to a desired surface. This is done by the use of an atomizer or spray gun of conventional design.

A more detailed description of a specific embodiment of my invention is given with reference to the drawings, wherein Figure 1 is a diagram showing the pressure vessel of my invention connected to a spray gun and to an air compressor through a check valve, reducing valve and air cleaner;

Figure 3 is a cross-sectional view taken on line 3—3 of Figure 2;

Figure 5 is a fragmentary plan view of the safety closure taken on line 5—5 of Figure 4.

The size of pressure vessel 10 will depend largely upon the amount of cement to be consumed, among other factors. I have found that a vessel of about 3 gallons' capacity serves quite well for most purposes, because relatively little cement is needed in my process. The shape of the vessel is not particularly material to the objects of my invention, but I have found that a vessel of generally rounded shape is conveniently fabricated by welding preshaped sections together. However, pressure vessel 10 need not be constructed as a single unit but can, for example, be made to have a body and a top, or lid, provided with clamping means and sealing means for effecting a gas-tight seal between the lid and the body of the vessel. Other designs of the vessel 10 also can be used.

Figure 2:
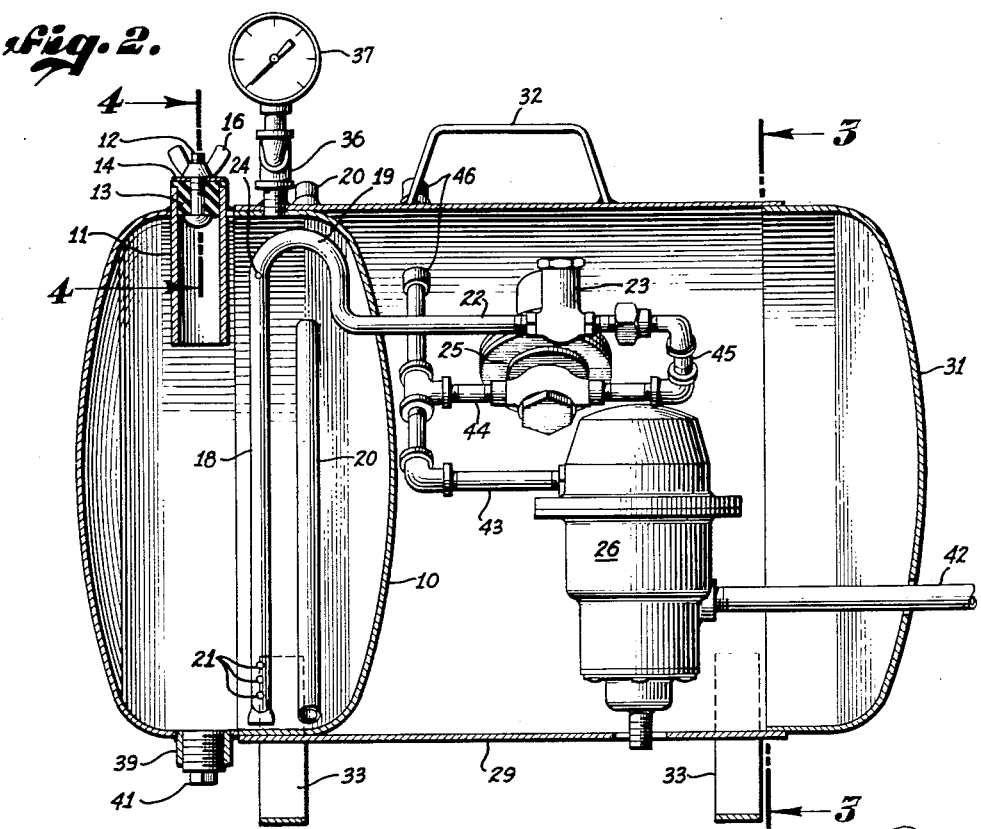
Figure 2 is an elevational view, partly in section, of an embodiment showing a compact arrangement of the pressure vessel, check valve, reducing valve and air cleaner enclosed in a portable container.
Figure 4:
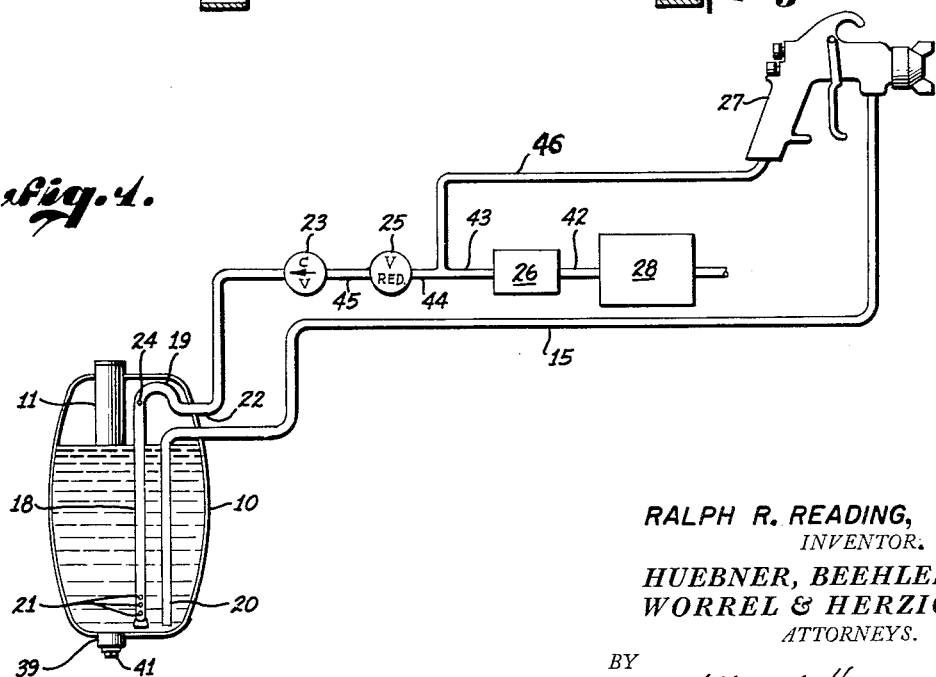
Figure 4 is a fragmentary vertical sectional view taken on line 4—4 of Figure 2 showing a detail of a gas-tight safety closure.

The vessel 10 shown in Figures 1 and 2 of the drawings is provided with a filling tube 11 with its upper end sealed into the wall of the upper end of the vessel and with its lower end extending into the interior of the vessel a predetermined distance. The tube 11 can be fixed into the wall of the vessel by welding or by threaded means, for example. The length of tube 11 extending into vessel 10 is determined to be about 2.5 inches so that upon filling the vessel with liquid cement through tube 11 to the level coinciding with the bottom of the tube, as shown in Figure 1, the vessel will contain about 2.5 gallons of cement and an air space of about 0.5 gallon will remain above the surface of the cement.

The diameter of tube 11 is about 1 inch for convenience of introducing cement therethrough. The mouth of the tube is provided with a gas-tight safety closure consisting of an inverted bolt 12 tightly fitted in a flanged rubber gasket 13 fitted into the tube 11; a pressure plate 14 and a wing nut 16 compress the gasket 13. The closure is prevented from blowing out of the tube by two clamping fingers 17 formed on the mouth of tube 11 and adapted to stop any upward movement of pressure plate 14.

Pressure vessel 10 also is provided with a gas inlet tube 18 extending to the bottom of the vessel. I prefer to form a gooseneck 19 in the upper portion of tube 18 close to the top of vessel 10 and to seal the bottom end of tube 18 as by tightly pinching or soldering it shut. Near the sealed end of the tube are formed a half-dozen or so apertures, or pin holes 21 of about $\frac{1}{32}$ inch diameter. These holes serve to disperse compressed gas charged to the vessel 10 to form an emulsion thereof in the liquid cement previously charged to the vessel.

Inlet tube 18 can conveniently be made of $\frac{1}{4}$ inch copper tubing in the embodiment shown in the drawing. The tube 18 is connected to a $\frac{1}{4}$ inch nipple 22 welded or threaded into the upper side wall of vessel 10. Connected to nipple 22 is a check valve 23 for checking the back-pressure in vessel 10. As a safeguard against the event of gas leakage past check valve 23, a small relief hole 24 of about $\frac{1}{32}$ inch diameter is drilled in the delivery leg of tube 18 just below the highest point in the goose-neck 19. Relief hole 24 will permit a leak-back from the air space in the upper part of vessel 10 rather than from the end of tube 18 at the bottom of the vessel and thus avoids leak-back of cement emulsion into check valve 23, pressure reducing valve 25, air cleaner 26, spray gun 27 and air compressor 28 during non-use of the apparatus, such as overnight or week-end non-use.

Emulsion discharge, or outlet tube 20, extends to almost the bottom of vessel 10 and penetrates the side wall thereof at about the same level as does nipple 22 and at about the initial level of the cement as determined by the lower end of filling tube 11. A $\frac{1}{4}$ inch pipe is used for this purpose. It is welded into the side wall of vessel 10 and its delivery end is connected to spray gun 27 through flexible pressure tubing 15.

Any convenient arrangement of the auxiliary apparatus about the pressure vessel 10 can be used, but I have found it advantageous to compactly enclose the check valve, pressure reducing valve and air cleaner together with the connecting lines in a cylindrical jacket 29 as shown in Figures 2 and 3. The pressure vessel 10 is welded into one end of the cylindrical jacket 29 and the other end of the jacket is closed by a removable dished end 31. The jacket 29 is provided with a carrying handle 32 and legs 33. Holes through the jacket wall accommodate a key 34 to the pressure reducing valve 25, a water discharge line from air cleaner 26, bypass air line 46, discharge tube 20 and a line 36 communicating with vessel 10 through the top wall thereof and connected to a pressure gage 37 and a safety valve 38. A short pipe nipple 39 is welded into the bottom wall of vessel 10 and is provided with a plug 41. The opening through the nipple can be used to drain vessel 10 if desired.

The conventional vulcanizing tire cements on the market containing about a pound of latex to a gallon of solvent, for use in the method and apparatus of my invention are diluted by using two volumes of these cements to three volumes of rubber solvents such as the hydrocarbon solvents or thinners marketed by petroleum refining companies for rubber solvent purposes. This renders the conventional tire cements more fluid and less viscous for better application by means of a spray gun as compared to the hand brushing application method generally used. A cement that has proven to be very satisfactory for my method and apparatus has the following dry composition, that is, minus the solvent:

|  | Per cent |
|---|---|
| Natural rubber | 84.84 |
| Zinc oxide | 4.25 |
| Accelerator | 0.85 |
| Curing aid | 1.01 |
| Antioxidant | 0.68 |
| Carbon black | 6.37 |
| Sulfur | 2.00 |
|  | 100.00 |

The cement slab stock of the above composition is mixed with a petroleum rubber solvent in the ratio of one pound of solids to three gallons of solvent until solution and suspension are complete. The finished cement has a viscosity of about 55 to 58 seconds through a 1/8 inch orifice Ford type test cup at 80° F.

Instead of natural rubber I may use other elastomers as the major component of the cement, especially for application to various articles other than tire carcasses. For example, a few of the synthetic elastomers that can be used are butyl rubber, butadiene styrene copolymer, butadiene acrylonitrile copolymer, polychloroprene, and alkylene polysulfide.

I prefer to use a specially selected petroleum solvent as the rubber solvent in the cement for tire carcasses because of its low cost, its inertness and its low toxicity. Other solvents, however, can be used such as benzene, cyclohexane, carbon tetrachloride and carbon disulfide, for example, especially for some of the various applications other than for tire carcasses. Water cannot be used as a component of the cement because it destroys its adhesive character. The accelerator, the curing aid and the antioxidant can be any of the well-known materials in these classes.

In the operation of the apparatus, air is taken from the atmosphere and compressed in compressor 28. The compressed air is passed through air cleaner 26 via lines 42 and 43 to remove condensed water therefrom. A bypass line 46 of flexible pressure tubing conveys compressed air to a spray gun 27 as required by the operator of the gun. From line 43 the dried compressed air is passed through pressure reducing valve 25 and check valve 23 via lines 44 and 45 and into pressure vessel 10 via nipple 22 and inlet tube 18. Other gases than air can be used in the method. For example, non-oxidizing gases such as nitrogen or carbon dioxide can be used.

To make up a batch of emulsion, about 2.5 gallons of rubber cement of the above-described characteristics is charged to vessel 10 through filling tube 11 and the tube is closed by means described above. Compressed air at an initial pressure of about 40 pounds per square inch gage, as controlled by reducing valve 25, is dispersed in the liquid cement through pin holes 21. After several seconds the pressure vessel 10 is filled with an air in cement emulsion under a pressure of about 40 pounds per square inch gage. By adjustment of reducing valve 25, the pressure in vessel 10 is then reduced to about 15 pounds per square inch gage for normal application purposes. The initial pressure can, however, be higher than 40 pounds per square inch, and may be as high as say 200 pounds per square inch gage, or higher. Similarly, the application pressure can be higher or lower than 15 pounds per square inch and may be as high as about 200 pounds per square inch gage, or higher, or as low as say about five pounds square inch gage, or lower.

When the cement is prepared as described above, it is an emulsion containing about 10 to about 20 per cent air and about 80 to about 90 per cent cement by volume of the mixture at the application pressure.

Although rubber cement can be effectively applied to many different types of articles by the use of my invention for illustrative purposes, I shall described the use of my method and apparatus for applying rubber cement to tire carcasses. The pressure of the compressed air fed to spray gun 27 is set at about 150 to 200 pounds per square inch while the pressure over the emulsion in vessel 10 is held at about 15 pounds per square inch. A tire carcass rotatably mounted on a holder is caused to rotate while the spray gun is put into operation and a thin uniform coat of cement is sprayed on the surface of the carcass in about five seconds. The spraying operation is stopped simply by the spray gun controls.

With the air and emulsion pressures set as described, about three cubic feet of air is used with about 1/6 ounce of cement. There is no need for the cement coating to dry and the camelback can be applied immediately to the sprayed carcass. Since there is used a very large volume of air and very small amount of cement the ratio of hydrocarbon solvent to air is below the range of explosive mixtures and there is no explosion or fire hazard in the vicinity of the spray gun operator. Also, for the same reason, the concentration of the hydrocarbon vapors produced during the spraying operation is sufficiently low to reduce to a minimum any health hazard to the operator.

In comparing my method and apparatus for spraying cement on the carcasses with the method of hand brushing application generally used in the tire retreading industry, some striking facts become apparent. In the first place the cement, heretofore a fire and health hazard during the hand brushing application, has been rendered fireproof and harmless to health by the use of my invention. Secondly, a saving of about 95 per cent in the cement consumed has been effected by my method. About 300 to 400 tires per gallon cement can be treated by my method compared to about 15 to 18 by the hand brushing method. Thirdly, as there is no requirement that the tires treated by my method be permitted to dry after coating them with cement, no drying racks are required. In the hand brushing method, drying times of about 1/2 to 1 1/2 hours are required. Furthermore, the danger of cement oxidation is minimized in my method, because of the elimination of the air drying time. Fourthly, only about five seconds is required to apply the cement coating to a tire carcass by my method as compared to about two to three minutes by the hand brushing method. Fifthly, because my spraying method produces a uniform cement coating on the tire, blow holes occasioned by patches of excessive amounts of cement, such as occur in hand brushing, have been eliminated. In addition, adhesion of the camelback to the tire carcass has been shown by tests to be about 25 per cent stronger when my method is used than when hand brushing is used.

A microscopic examination of the air in cement emulsions produced as described above in pressure vessel 10 revealed the presence of a multiplicity of minute air bubbles evenly dispersed throughout the emulsion and in intimate contact with the surrounding liquid and solid components of the cement composition. This uniform emulsion accounts for the fact that solid components of the cement composition do not settle out of the emulsion in vessel 10 even during prolonged standing periods, during which the pressure in the vessel is maintained at about ten to fifteen pounds per square inch gage. Also, no sludging or gumming of the spray gun occurs even after the emulsion has set for prolonged periods. In the liquid cement itself, on the other hand, solid components settle after standing periods of about an hour, and it is necessary to agitate the mixture to again disperse the solids in the liquid cement.

If a liquid cement, instead of my emulsion, is fed directly to the spray gun with a stream of air under pressure, there is sludging and gumming of the spray gun and an uneven coating of cement results. It frequently becomes necessary to agitate and re-suspend the settled solids in the liquid. In addition, the explosion and health hazards are increased when using the liquid cement instead of my emulsion of gas in liquid cement.

Although I have described my invention largely with reference to the application of rubber cement to a tire carcass, it will readily be understood that the invention can advantageously be used in the formation of many other articles and for the provision of a coating of rubber on many types of surfaces. My invention, therefore, is not to be restricted except as necessitated by the prior art and by the spirit of the appended claims.

Having described my invention, what I claim new and desire to secure by Letters Patent is:

1. A method of applying rubber cement which includes an inflammable solvent, comprising forming an emulsion of air in the cement in a dispersion zone by introducing said air under pressure into a substantial body of cement maintained in said zone at superatmospheric pressure continuously withdrawing a stream of the emulsion from the dispersion zone, forming an independent stream of air, continuously mixing the emulsion stream with said independent stream of air in a mixing zone, and continuously directing the resulting mixture of emulsion and air onto a surface to form a thin uniform coating of rubber cement thereon.

2. A method of applying rubber cement which includes an inflammable solvent, comprising introducing a measured amount of the cement into a dispersion zone, introducing a quantity of air at superatmospheric pressure into the cement under emulsion conditions to form a stable dispersion of gas and cement under pressure, continuously withdrawing a stream of the emulsion from the dispersion zone, continuously withdrawing a separate stream of air from a source of air under superatmospheric pressure, continuously mixing the streams of emulsion and said separate stream of air in a mixing zone to form a spray of emulsion suspended in air, and continuously directing the resulting spray onto a surface to form a thin uniform coating of rubber cement thereon.

3. A method of applying rubber cement comprising introducing a measured amount of liquid rubber cement composition comprising an elastomer and an inflammable solvent into an enclosed dispersion zone, introducing a quantity of air into the cement under conditions to form an emulsion of air in the liquid cement at a pressure in the range of about 5 pounds to about 200 pounds per square inch, continuously withdrawing a stream of the emulsion from the dispersion zone, continuously withdrawing a separate stream of air from a source of air under superatmospheric pressure, continuously mixing the streams of emulsion and air in a mixing zone to form a spray of emulsion suspended in gas, and continuously directing the resulting spray onto a surface to form a thin uniform coating of rubber cement thereon.

4. A method of applying rubber cement to a surface comprising introducing about 2.5 volumes of liquid rubber cement composition comprising rubber and an inflammable solvent into an enclosed dispersion zone of about 3.0 volumes capacity, introducing a quantity of air into the liquid cement under conditions to form an emulsion of air in the cement at a pressure in the range of about 5 pounds to about 200 pounds per square inch, continuously withdrawing a stream of the emulsion from the dispersion zone, continuously withdrawing a stream of air from a source of air under superatmospheric pressure, continuously mixing the streams of emulsion and air in a mixing zone to form a spray of emulsion suspended in air containing of the order of a fraction of an ounce of cement to several cubic feet of air, and continuously directing the resulting spray onto a surface to form a thin uniform coating of rubber cement thereon.

References Cited in the file of this patent

UNITED STATES PATENTS

| | | |
|---|---|---|
| 1,194,358 | Cecil | Aug. 15, 1916 |
| 1,212,086 | Michelsen | Jan. 9, 1917 |
| 1,488,125 | Kline | Mar. 25, 1922 |
| 1,751,343 | Mack | Mar. 18, 1930 |
| 1,752,530 | Lynn | Apr. 1, 1930 |
| 1,760,879 | Maynard | June 3, 1930 |
| 1,986,444 | McIntosh | Jan. 1, 1935 |
| 2,241,391 | Bollinger | May 13, 1941 |
| 2,249,205 | Hansen | July 15, 1941 |
| 2,281,087 | Kutz | Apr. 28, 1942 |
| 2,297,871 | Campbell | Oct. 6, 1942 |
| 2,346,440 | Lessig | Apr. 11, 1944 |